March 30, 1937. W. A. MORTON 2,075,452
GLASS ANNEALING LEHR
Filed Feb. 14, 1935 2 Sheets-Sheet 1
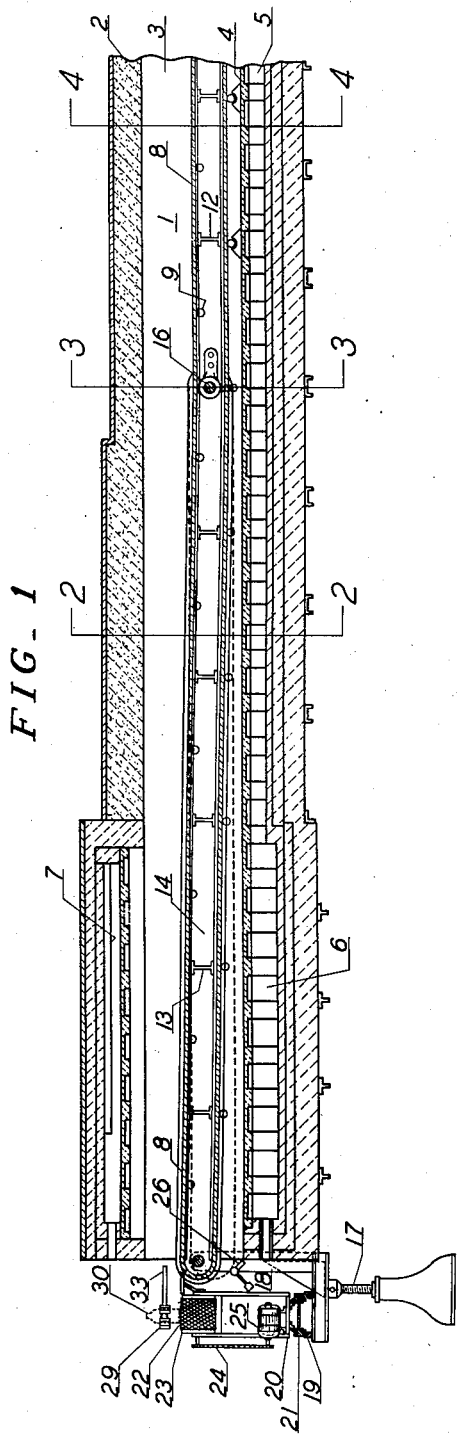
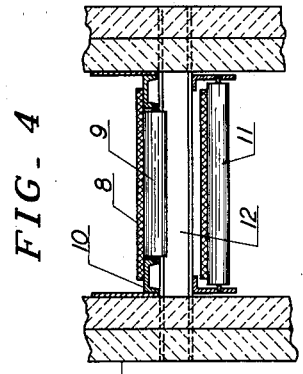
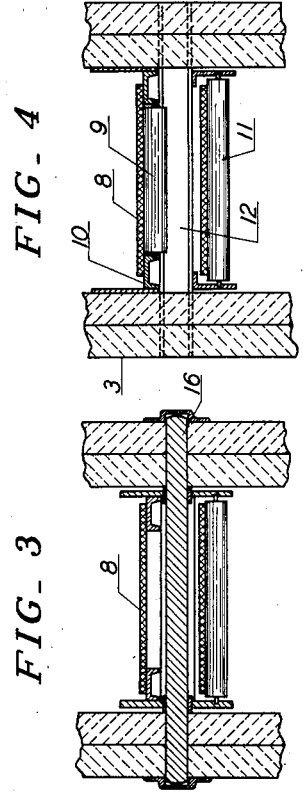
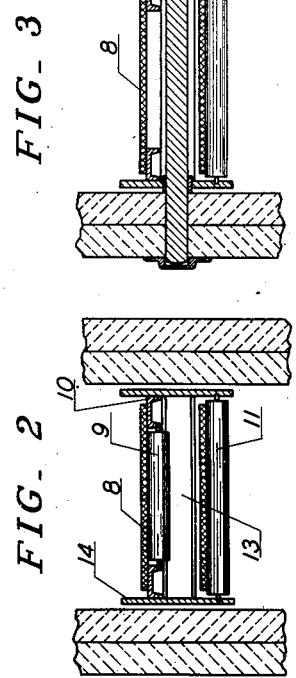
INVENTOR.
William A. Morton
BY William B. Jaspert.
ATTORNEY.

March 30, 1937.  W. A. MORTON  2,075,452
GLASS ANNEALING LEHR
Filed Feb. 14, 1935  2 Sheets-Sheet 2
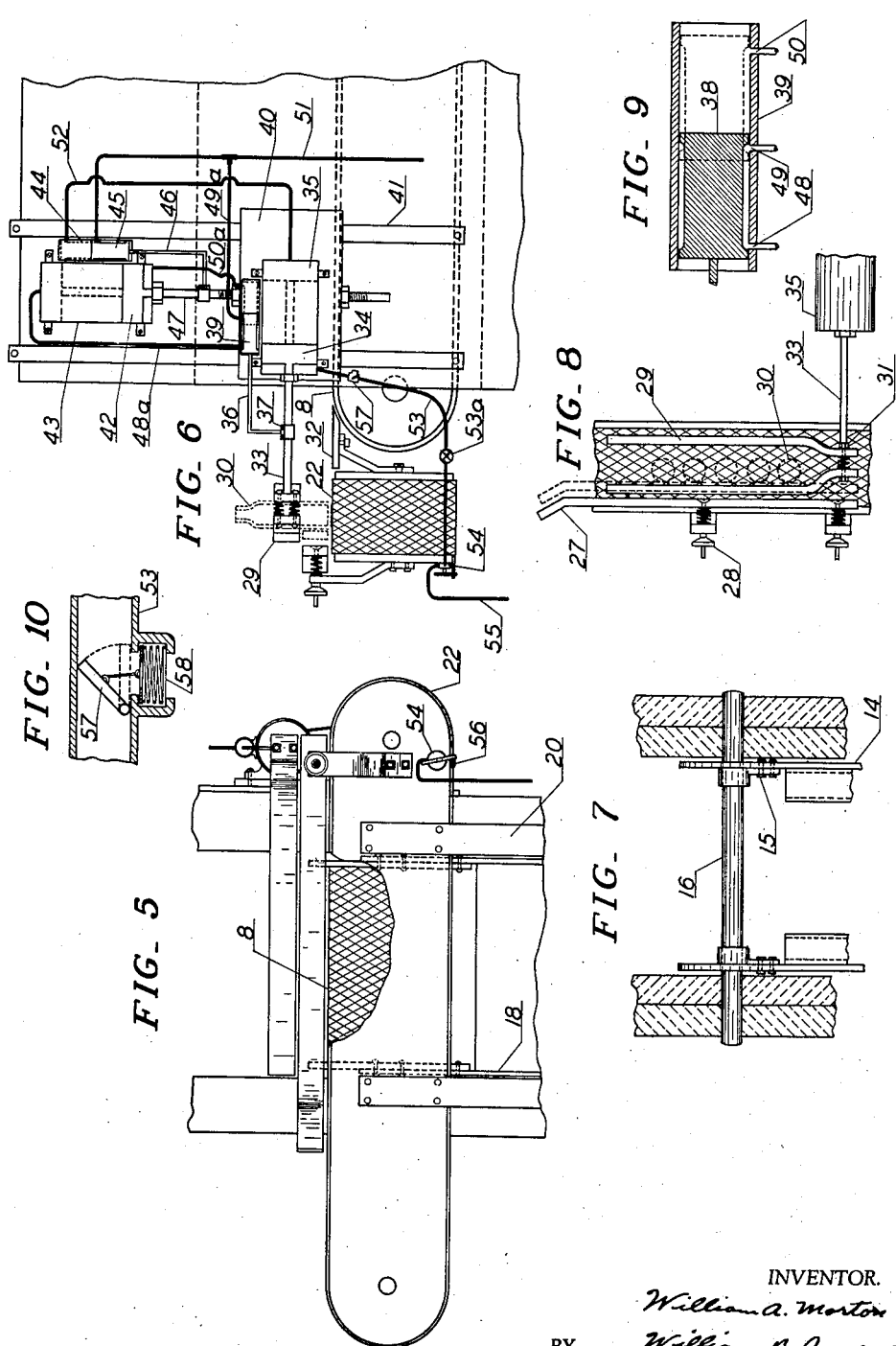
INVENTOR.
William A. Morton
BY William B. Jaspert
ATTORNEY.

Patented Mar. 30, 1937

2,075,452

UNITED STATES PATENT OFFICE 2,075,452

GLASS ANNEALING LEHR

William A. Morton, Mount Lebanon, Pa., assignor to Amco, Incorporated, Pittsburgh, Pa., a corporation of Pennsylvania Application February 14, 1935, Serial No. 6,436

8 Claims. (Cl. 198—20)

This invention relates to new and useful improvements in glass annealing lehrs more particularly to improvements in the method of loading ware on the conveyor belt passing through the annealing tunnel, and it is among the objects thereof to provide means for adjusting the level of the receiving end of the lehr conveyor to accommodate glassware of different heights.

A further object of the invention is the provision of mechanism for loading the ware on the lehr conveyor in an efficient manner, with a minimum of adjustments necessary for the accommodation of the conveyor and loading mechanism to the different sizes and kinds of ware received from the ware forming machines.

Various forms of so-called lehr loaders or stackers have been heretofore proposed, most of which employ escalator bucks or the like for conveying ware from one level at a receiving station to a different level of a fixed lehr conveyor, these devices being complicated and very costly both in the initial installation and maintenance. The escalators are, of course, adjustable to accommodate the ware supporting flights to the different levels at which the ware is received, and the movement of the escalator must be intermittent but is synchronized with the take-out mechanism that delivers the ware from the forming machine and the loading or transfer mechanism that removes it to the lehr conveyor. This intermittent motion is unsatisfactory for higher speed modern machines because the quick motions of starting and stopping twenty to forty times per minute upsets considerable ware and varies it from the desired position by excessive vibration.

In the present invention, these costly auxiliary devices are dispensed with by making the receiving end of the lehr conveyor throughout its width adjustable vertically for a substantial portion of its length, this being accomplished by mounting the receiving end of the conveyor belt on a supporting frame that is hinged or pivoted in a desired manner a substantial distance back from the receiving end of the lehr. The auxiliary loading conveyor is mounted to be simultaneously adjustable with the lehr conveyor and this loader conveyor is adapted to be moved out of the way from the forming machines to provide access to the latter in crowded manufacturing plants for mold changes on the ware forming machines with which it must be closely associated.

The structural features and their mode of operation will become more apparent from a consideration of the accompanying drawings constituting a part hereof in which like reference characters designate like parts and in which:

Fig. 1 is a vertical cross-sectional view extending longitudinally of the forward portion of a glass annealing lehr showing a lehr conveyor and loader mechanism embodying the principles of this invention;

Figs. 2, 3 and 4 are cross-sectional views taken along the lines 2—2, 3—3 and 4—4, Fig. 1;

Fig. 5 a front elevational view of the lehr and loader mechanism;

Fig. 6 a side elevation of the front of the lehr and loader mechanism;

Fig. 7 a plan view of the conveyor supporting frame at the hinged portion thereof;

Fig. 8 a plan view of the loader and transfer mechanism;

Fig. 9 a cross-section of a valve utilized in controlling the operations of the transfer arm; and Fig. 10 a bleeder valve used in the manner hereinafter described.

With reference to the several figures of the drawings, the structure therein illustrated comprises an annealing tunnel 1 constituted by top, side and bottom walls 2, 3 and 4, respectively, a flue 5 being provided beneath the tunnel, and fire boxes 6 and 7 below and above the forward end of the tunnel, respectively.

Disposed within the tunnel 1 is an endless conveyor 8 of woven wire cloth as shown in Fig. 5, the top or ware supporting strand of which passes over rollers 9 and channels 10, the latter supporting the edges of the belt, and the return strand is supported by rollers 11 as is shown in Fig. 4 of the drawings. I-beams 12 extend between the top and bottom strands of the conveyor through the side walls 3 of the annealing tunnel excepting at the adjustable end of the lehr conveyor where the I-beams 13 are secured to side plates 14 which, as shown in Fig. 7, are secured to hinge brackets 15 that are pivotally mounted on shaft 16 extending through the walls of the tunnel.

The same construction of supporting rollers 9, channels 10 and rollers 11 is employed on the hinged portion of the conveyor frame as at the rear portion, this being shown in Fig. 2, the channel and rollers being mounted between the side plates 14 that are hinged on the shaft 16. The forward end of the conveyor frame is mounted to be movable vertically by a screw jack 17, any adjustment of which will cause the con-

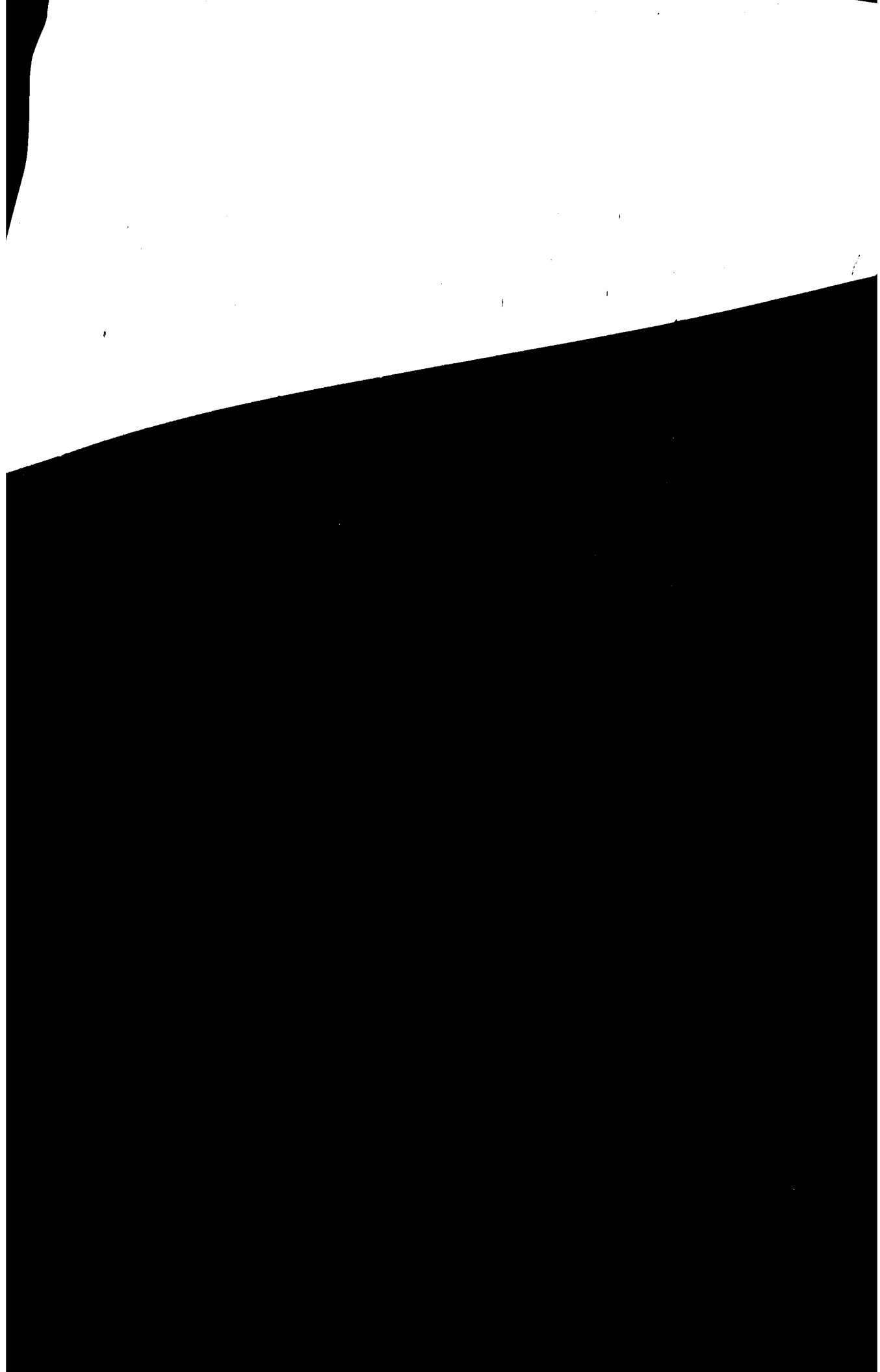

Although one embodiment of the invention has been herein illustrated and described, it will be obvious to those skilled in the art that various modifications may be made in the details of construction without departing from the principles herein set forth.

I claim:

1. In a lehr loading and conveying mechanism, the combination with a main conveyor of a loading device in cooperative alignment therewith, said conveyor being mounted on a jointed frame, and means for adjusting one end of said frame to thereby adjust the vertical position of the conveyor and the loading device delivery station.

2. In a lehr loading and conveying mechanism for glass annealing lehrs, a ware receiving station, an endless conveyor disposed in an annealing tunnel, one end of the conveyor being located adjacent the ware receiving station, a jointed frame for supporting said conveyor, and means for vertically adjusting the ware receiving station and the conveyor frame at the receiving end of the conveyor while maintaining one portion of the frame in a normal fixed position to thereby vary the vertical position of the receiving end of the conveyor and the ware receiving station.

3. In a lehr loading and conveying mechanism for glass annealing lehrs, an endless conveyor of woven wire mesh for moving the ware through an annealing tunnel, a jointed frame for supporting said conveyor extending longitudinally of said tunnel and having a pivotal joint a substantial distance from the front of the conveyor, the front portion of the frame extending to the front end of the conveyor and being movable around the pivotal joint to vary the vertical adjustment of the receiving end of the conveyor and the frame in the rear of the tunnel being secured against movement in a fixed horizontal plane, and means located externally of the annealing tunnel for adjusting said movable frame portion to thereby vary the vertical position of the front end of the conveyor.

4. In a lehr loading and conveying mechanism for glass annealing lehrs, an endless conveyor for moving the ware through an annealing tunnel, a jointed frame for supporting said conveyor the frame extending on both sides of the conveyor, the portion of the frame at the receiving end of the conveyor being vertically movable and the remaining portion being stationary, a ware transfer mechanism having a ware bearing surface in alignment with the surface of the main conveyor, and means for simultaneously adjusting the transfer mechanism and receiving portion of the main conveyor relative to a ware delivery station.

5. Glass annealing apparatus comprising an annealing tunnel, a conveyor mechanism disposed in said tunnel, a hinged frame supporting said conveyor mechanism, one portion of said frame being fixed relative to the top and bottom walls of the lehr and the remaining portion being movable about a hinge, a ware transfer mechanism adjacent the receiving end of the conveyor having its ware supporting surface in alignment with the ware supporting surface of the main conveyor, a transfer arm for moving the ware from the transfer mechanism to the main conveyor belt, and means for simultaneously adjusting the vertical position of the transfer and conveying mechanisms relative to a ware delivery station, said means being operative to move a portion of the hinged frame.

6. In a glass annealing lehr, a conveying and transfer mechanism comprising an endless conveyor for passing ware through an annealing tunnel, a loading conveyor having its ware supporting strand in alignment with the ware supporting strand of said main conveyor, a hinged frame for the main conveyor, a supporting frame attached to said main frame externally of the annealing tunnel for supporting said loading conveyor, and means for simultaneously adjusting said frame and one portion of the hinged frame to vary the vertical position of said main and loading conveyors relative to a ware delivery station.

7. Glass conveying and transfer mechanism comprising a lehr conveyor, a hinged frame supporting said conveyor, a loading conveyor in cooperative alignment with said first named conveyor, means for simultaneously elevating or lowering the loading conveyor and one end of the main conveyor, and means for moving said loading conveyor and its support relative to the main conveyor frame.

8. In a glass annealing lehr a main conveyor extending therethrough, a frame supporting said conveyor having a hinged joint a substantial distance from the front of the conveyor, a loading conveyor having a supporting frame mounted on said main conveyor frame, means for simultaneously adjusting the vertical position of said loading conveyor and the free end of the hinged conveyor frame, and transfer mechanism mounted to engage the ware and transfer the same from one conveyor to another, said transfer mechanism being operated in timed relation with the movement of said loading conveyor.

WILLIAM A. MORTON.